(12) United States Patent
Jiang et al.

(10) Patent No.: US 10,432,303 B2
(45) Date of Patent: Oct. 1, 2019

(54) METHOD AND APPARATUS FOR PROVIDING A PILOT TONE

(71) Applicant: Huawei Technologies Co., Ltd., Shenzhen (CN)

(72) Inventors: Zhiping Jiang, Kanata (CA); Tejia Liu, Shenzhen (CN); Hong Yang, Shenzhen (CN); Dajiang Jin, Sichuan (CN); Minggang Si, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 362 days.

(21) Appl. No.: 15/200,325

(22) Filed: Jul. 1, 2016

(65) Prior Publication Data

US 2017/0373748 A1  Dec. 28, 2017

Related U.S. Application Data

(63) Continuation of application No. PCT/CN2016/087122, filed on Jun. 24, 2016.

(51) Int. Cl.
*H04B 10/08* (2006.01)
*H04B 10/077* (2013.01)
*H04J 14/02* (2006.01)

(52) U.S. Cl.
CPC .......... *H04B 10/0775* (2013.01); *H04J 14/02* (2013.01); *H04B 2210/075* (2013.01)

(58) Field of Classification Search
CPC ............ H04B 10/0775; H04B 10/6161; H04B 10/2513; H04B 10/25133; H04B 10/697;

(Continued)

(56) References Cited

U.S. PATENT DOCUMENTS 6,046,838 A * 4/2000 Kou ...................... G02F 1/0516
                                                      359/239
7,103,281 B1 * 9/2006 Poustie ................ H04B 10/299
                                                      398/148

(Continued)

FOREIGN PATENT DOCUMENTS

CN        101273557 A     9/2008
CN        102870351 A     1/2013

(Continued)

OTHER PUBLICATIONS

Park, et al., "A novel chromatic dispersion monitoring technique using frequency-modulated and amplitude-modulated pilot tones," Optical Fiber Communication Conference, 2006 and The 2006 National Fiber Optic Engineers Conference OFC 2006, Jan. 1, 2006, 4 pages.

*Primary Examiner* — Hibret A Woldekidan
(74) *Attorney, Agent, or Firm* — Slater Matsil, LLP

(57) ABSTRACT

The disclosure is directed at a method and system for optical telecommunications performance monitoring via a dual frequency pilot tone. By applying a dual frequency pilot tone, with a first pilot tone frequency selected from a low frequency band and a second pilot tone frequency selected from a high frequency band, either simultaneously or alternatively, to a wavelength channel, one of the pilot tone frequencies may be adaptively selected to improve wavelength channel monitoring. More specifically, stimulated Raman scattering (SRS) caused crosstalk and chromatic dispersion (CD) caused pilot fading which adversely affect performance monitoring of the wavelength channel may be reduced.

16 Claims, 10 Drawing Sheets

(58) Field of Classification Search
CPC ........ H04B 2210/075; H04B 10/07951; H04B 10/2537; H04B 10/2507; H04B 10/2543; H04B 10/2563; H04B 10/58; H04B 10/0795; H04B 10/0773; H04B 10/0793; H04B 10/079; H04L 5/0048; H04L 5/0053; H04L 5/0073; G02B 6/29394; H04J 14/02; H04J 3/14; H04J 14/0221
USPC .............. 398/25, 32, 28, 29, 81, 159, 30, 38
See application file for complete search history.

(56) References Cited

U.S. PATENT DOCUMENTS

| | | | | |
|---|---|---|---|---|
| 8,032,022 | B2* | 10/2011 | Zhou | H04B 10/0773 |
| | | | | 398/32 |
| 8,078,054 | B2 | 12/2011 | Jiang et al. | |
| 9,614,638 | B2* | 4/2017 | Kim | H04J 14/0221 |
| 9,941,960 | B2* | 4/2018 | Jiang | H04B 10/077 |
| 10,148,351 | B2* | 12/2018 | Jiang | H04B 10/077 |
| 2002/0105634 | A1* | 8/2002 | Aoki | G01M 11/3163 |
| | | | | 356/73.1 |
| 2002/0114555 | A1 | 8/2002 | Seydnejad et al. | |
| 2002/0154372 | A1* | 10/2002 | Chung | H04B 10/0775 |
| | | | | 398/187 |
| 2003/0067646 | A1* | 4/2003 | Wan | H04B 10/505 |
| | | | | 398/79 |
| 2004/0208525 | A1 | 10/2004 | Seydnejad et al. | |
| 2004/0237016 | A1* | 11/2004 | Sudo | H04L 1/0059 |
| | | | | 714/748 |
| 2007/0280700 | A1* | 12/2007 | Remedios | H04B 10/07 |
| | | | | 398/183 |
| 2008/0130097 | A1* | 6/2008 | McKinstrie | G02F 1/395 |
| | | | | 359/330 |
| 2009/0297153 | A1* | 12/2009 | Mutalik | H04B 10/58 |
| | | | | 398/81 |
| 2011/0228838 | A1* | 9/2011 | Yang | H04B 3/23 |
| | | | | 375/232 |
| 2016/0065303 | A1 | 3/2016 | Shang et al. | |
| 2017/0255078 | A1* | 9/2017 | Jiang | G02B 6/351 |
| 2018/0294874 | A1* | 10/2018 | Jiang | H04B 10/07951 |
| 2019/0123819 | A1* | 4/2019 | Jiang | H04B 10/0795 |

FOREIGN PATENT DOCUMENTS

| | | |
|---|---|---|
| CN | 103378906 A | 10/2013 |
| CN | 104065412 A | 9/2014 |
| CN | 104104431 A | 10/2014 |
| EP | 2538594 A2 | 12/2012 |
| WO | 2009021454 A1 | 2/2009 |
| WO | 2010072423 A1 | 7/2010 |

* cited by examiner

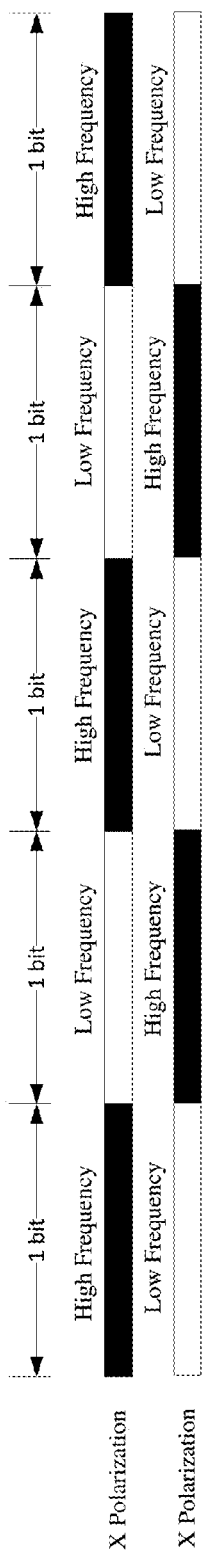
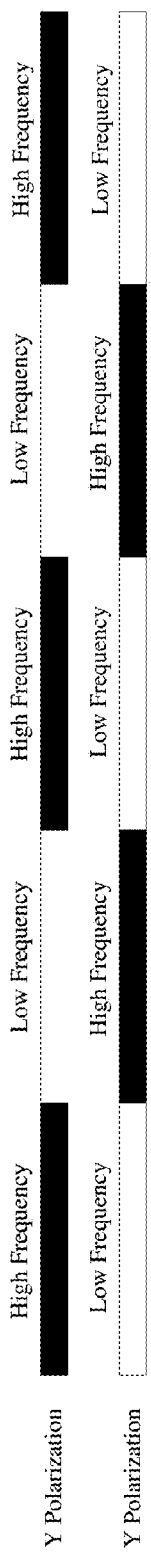
Figure 8a
Figure 8b

METHOD AND APPARATUS FOR PROVIDING A PILOT TONE

CROSS-REFERENCE TO RELATED APPLICATIONS

This application is a continuation of PCT Application No. PCT/CN2016/087122, filed on Jun. 24, 2016, which application is hereby incorporated herein by reference.

TECHNICAL FIELD

The disclosure is directed generally at optical telecommunications and more specifically at a method and apparatus for optical channel monitoring.

BACKGROUND

In Dense Wavelength Division Multiplexing (DWDM) systems, light at multiple wavelengths is modulated with streams of digital information, and then the modulated light beams at different wavelengths, termed "wavelength channels", are combined for joint propagation in an optical fiber.

To identify wavelength channels in a DWDM system, a pilot tone may be applied to communication channels within the optical telecommunications system. The pilot tone is typically a low frequency modulation of a channel's optical power level. The pilot tone may be used for channel optical performance monitoring, and may also carry information associated with the channel, such as, but not limited to, its wavelength, baud rate, modulation format and other identification information for supervisory, control, equalization, continuity, synchronization, or reference purposes.

By providing this pilot tone, channel power can be monitored by a low cost, low speed pilot-tone detector.

In many current systems, the pilot tone is subject to degradation caused by the interaction and superposition of optical signals in the transmission fiber.

Therefore, there is a need for an improved system and method for pilot tone based optical performance monitoring.

SUMMARY

The disclosure is directed at a method and system for optical telecommunications performance monitoring by using dual frequency pilot tones. By applying a dual frequency pilot tone to a wavelength channel, or channel, one of the pilot tone frequencies may be adaptively selected to improve wavelength channel monitoring power accuracy. In one embodiment, the first pilot tone frequency is selected from a low frequency band and the second pilot tone frequency is selected from a high frequency band. The dual frequency pilot tone is applied either simultaneously or alternatively to the system. By applying a dual frequency pilot tone, stimulated Raman scattering (SRS) and chromatic dispersion (CD) issues or effects which adversely affect performance monitoring of the wavelength channel may be reduced.

In one aspect of the disclosure, there is provided a method of optical telecommunications performance monitoring which includes detecting a pilot tone associated with a wavelength channel, the pilot tone including a first frequency in a first frequency range and a second frequency in a second frequency range. One of the frequencies of the pilot tone is then selected to obtain the wavelength channel information. In another aspect, each of the frequencies of the pilot tone carries identical channel information. In one aspect of the disclosure, the first frequency range is between 30 MHz and 60 MHz and the second frequency range is between 125 MHz and 155 MHz.

In another aspect, there is provided another method of optical telecommunications performance monitoring which includes applying a dual frequency pilot tone to a channel. In another aspect of the disclosure, the dual frequency pilot tone includes a first frequency in a first frequency range and a second frequency in a second frequency range. In another aspect of the disclosure, the first frequency range is selected to lessen chromatic dispersion effects and the second frequency range is selected to lessen stimulated Raman scattering (SRS) effects.

In yet a further aspect, there is provided a pilot tone modulated onto a wavelength channel, the pilot tone including a first frequency within a first frequency range and a second frequency located within a second frequency range.

BRIEF DESCRIPTION OF THE DRAWINGS

The following figures illustrate various aspects and embodiments of the system, method and apparatus disclosed herein:

FIG. 1b is a schematic diagram of a channel within the optical telecommunications system of FIG. 1a;

FIG. 8a is a schematic diagram of an embodiment of applying a dual frequency pilot tone for an optical telecommunications system;

FIG. 8b is a schematic diagram of another embodiment of applying a dual frequency pilot tone for an optical telecommunications system;

FIG. 10 is a block diagram of a pilot tone detector.

DETAILED DESCRIPTION OF ILLUSTRATIVE EMBODIMENTS

The disclosure is directed at a method and system for performing channel monitoring within an optical telecommunications system. The method and system of the disclosure uses a dual frequency pilot tone. One of the dual frequencies is selected from a low frequency band, or range, while the other is selected from a high frequency band, or range. In one embodiment, the low frequency band is between 30 MHz and 60 MHz and the high frequency band is between 125 MHz and 155 MHz. Use of a dual frequency pilot tone assists the system to mitigate adverse operating conditions within the optical telecommunication system.

In order to reduce issues with stimulated Raman Scattering (SRS), a high frequency pilot tone is preferred. In order to reduce accumulated chromatic dispersion issues, a low frequency pilot tone is preferred. Therefore, the disclosure is directed at providing a dual frequency pilot tone for a wavelength channel whereby both pilot tone frequencies may carry the same, or identical data, or wavelength channel information.

Figure 1A:
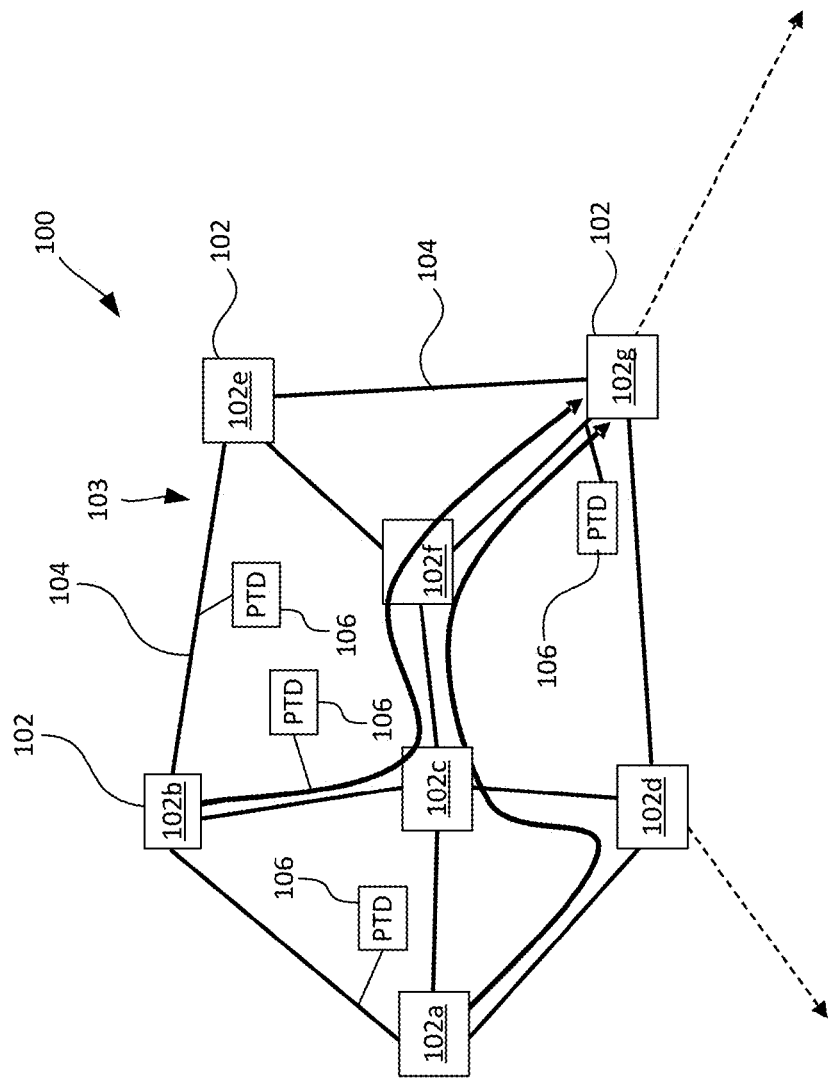
FIG. 1a is a schematic diagram of an optical telecommunications system.

Turning to FIG. 1a, a schematic diagram of an optical telecommunications system is shown. The optical telecommunications system, or optical network, 100 includes a set of nodes 102a-102g which are connected with each other via individual optical transmission fibers 103. The nodes 102 may be connected with each other via more than one transmission fiber 103. Signals transmitted along these individual transmission fibers 103 produce a plurality of wavelength channels, or channels, 104, each wavelength channel including light at a particular wavelength modulated with a high-speed digital stream of information or data. For ease of understanding, a transmission node is seen as the node 102a which is delivering data while a destination, or receiving, node 102g is seen as a node which is receiving the data. In some cases, communication between two nodes may not be direct. By way of example, communication between the transmission node 102a and the destination node 102g is such that the data passes through other nodes, such as 102b and 102e between the transmission node 102a and the destination node 102g.

In order to monitor the wavelength channels 104 being transmitted over the transmission fibers 103, pilot tones are used. A pilot tone is typically a low frequency modulation of a channel's optical power level. Distinct pilot tones may be associated with each particular wavelength channel within the network 100. The pilot tones may include information such as characteristics of the associated wavelength channel. These characteristics may include, but are not limited to, power, source/destination identification (ID), wavelength, modulation format or baud rate or any other characteristics or combination of those characteristics.

The pilot tones are modulated onto the wavelength channels 104 travelling between the transmission nodes 102a-102g. Detection of these pilot tones provides an identification of which channels 104 are being transmitted over which transmission fiber 103 at any time within the network 100, which is particularly useful when multiple channels 104 are transmitted over a same transmission fiber 103.

Within the network 100 are a set of pilot tone detectors 106 which detect these pilot tones. In one embodiment, the pilot tone detectors 106 include a low-speed photodiode and a digital signal processor (DSP).

Figure 1B:
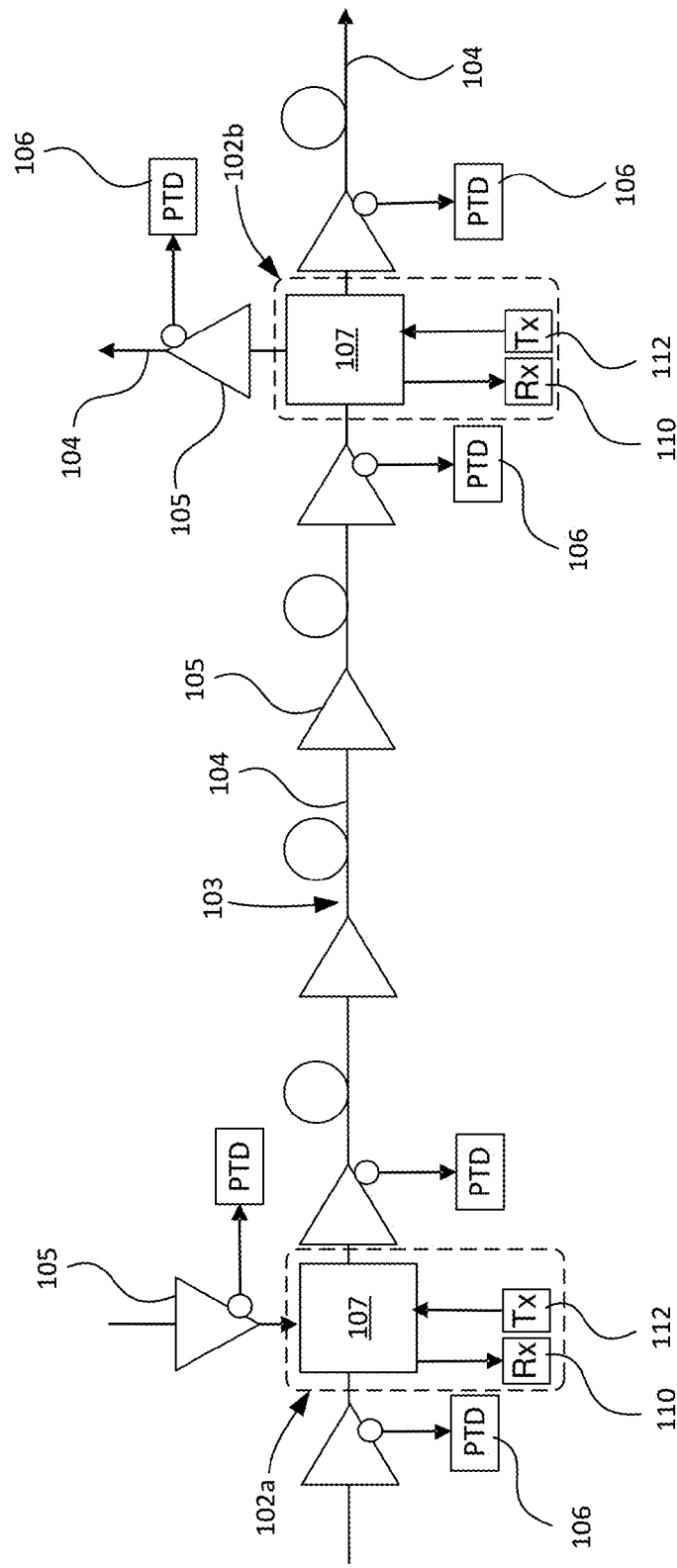

Turning to FIG. 1b, a schematic diagram showing a portion of the optical telecommunications system of FIG. 1a is provided. FIG. 1b shows the connection between two nodes 102a and 102b which are connected by the transmission fiber 103. Optical amplifiers 105 are provided to amplify the channel 104. In FIG. 1b, one of the nodes 102a may be seen as the source, or transmission, node, and the second of the nodes 102b may be seen as the destination node. In the embodiment of FIG. 1b, although individual pilot tone detectors 106 are shown at specific locations within the transmission fiber 103 between the two nodes 102, the pilot tone detectors 106 may be located anywhere within the network 100. Depending on the type of nodes 102a or 102b, the nodes 102a or 102b may include a reconfigurable optical add/drop multiplexor (ROADM) 107 coupled to receivers 110 and transmitters 112 for dropping and adding channels. For example, if the node 102 is an amplifier node, the node 102 would not include any receiver or transmitter, however, if the node 102 is an access node, there may be 0, one or multiple receivers 110 and transmitters 112. Accordingly, the wavelength channels 104 may terminate at a destination node 102b or propagate further, as shown with an arrow to the right of the node 102b.

Figure 2:
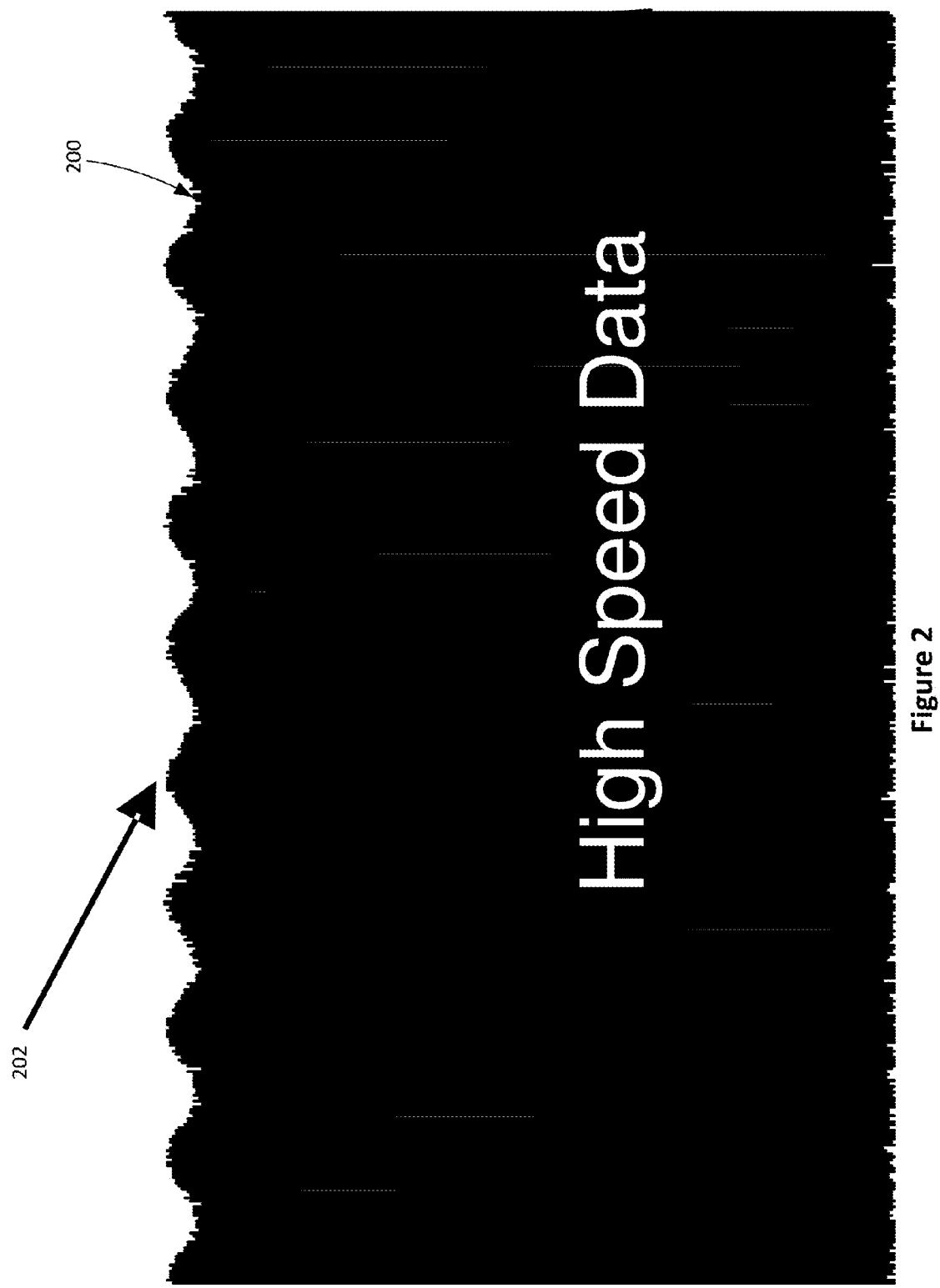
FIG. 2 is a schematic diagram of a pilot tone.

Turning to FIG. 2, a schematic representation of an optical signal is provided. The optical signal includes high-speed data 200 which is modulated onto light at a certain wavelength. The modulation of the light generates a wavelength channel. The data modulation frequency of the wavelength channel is typically in the GHz range. The optical signal also includes a pilot tone 202. The pilot tone may be used for supervisory, control, equalization, continuity, synchronization, or reference purposes for the optical telecommunications system 100. The frequency of the pilot tone 202 is preferably much less than the data modulation frequency of the wavelength channel. For example, the frequency of the pilot tone 202 may be at tens or hundreds of MHz or below.

Currently, a single frequency pilot tone is used to transmit information relating to an associated wavelength channel to assist in monitoring performance of the telecommunication system. In multiple channel optical telecommunications systems, or networks, stimulated Raman scattering (SRS) caused crosstalk is experienced. Use of the single frequency pilot tone is adversely affected by the SRS crosstalk. To overcome this problem, the SRS crosstalk is suppressed by increasing the frequency of the single frequency pilot tone.

Within these optical telecommunication systems, different wavelength channels are transmitted along the optical transmission fibers to allow the nodes 102 to transmit information therebetween. SRS is a nonlinear optical effect whereby energy from a shorter wavelength channel is partially transferred to a longer wavelength channel. This effect may occur between any two channels, although it is more pronounced between neighboring channels.

When a first wavelength channel is modulated with a pilot tone, this first pilot tone is partially transferred to another wavelength channel due to SRS effect. This creates a ghost tone on this other channel. Without the ghost tone, the pilot tone detected for this other channel is proportional to its corresponding channel power. With SRS caused ghost tones, the detected pilot tone of the other channel has contributions from pilot tones of other wavelength channels, such as the pilot tone of the first wavelength channel. The power measurement accuracy for the other channel is reduced due to the ghost tone or tones.

Figure 3:
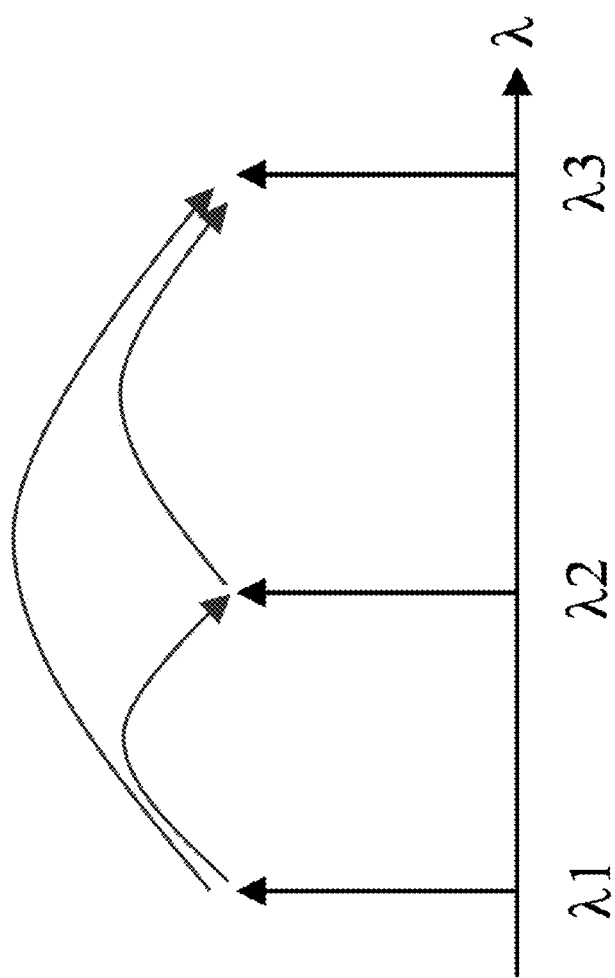
FIG. 3 is a schematic diagram reflecting how stimulated Raman scattering (SRS) affects optical telecommunication systems having multiple channels.

Turning to FIG. 3, a schematic diagram reflecting how SRS affects optical telecommunication systems having multiple optical channels is shown. Due to SRS effects, a pilot tone frequency f1 initially applied on wavelength 1 ($\lambda$1) will also appear on wavelengths 2 ($\lambda$2) and 3 ($\lambda$3). Similarly, a pilot tone frequency f2 initially applied on wavelength 2 ($\lambda$2) may also appear on wavelengths 1 ($\lambda$1) and 3 ($\lambda$3). Pilot tone frequency f3 initially applied on wavelength 3 ($\lambda$3) may also appear on wavelengths 1 ($\lambda$1) and 2 ($\lambda$2). The SRS caused crosstalk depends on a number of factors. These factors include the number of channels in the transmission fiber, channel wavelengths, the optical power of the channels, number of fiber spans, fiber type, fiber length etc. SRS crosstalk may cause significant power measurement error in a pilot tone based optical performance monitoring. In some scenarios, the error is so big that pilot tone based optical performance monitoring is not beneficial and may be useless.

Figure 4B:
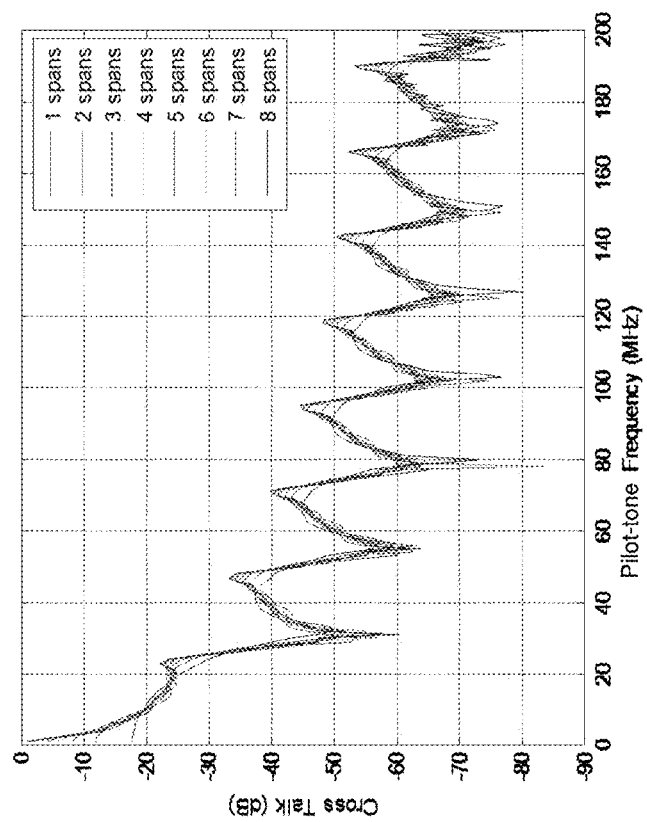
FIG. 4b is a graph illustrating frequency dependency of SRS for a transmission link based on an SSMF optical fiber.
Figure 4A:
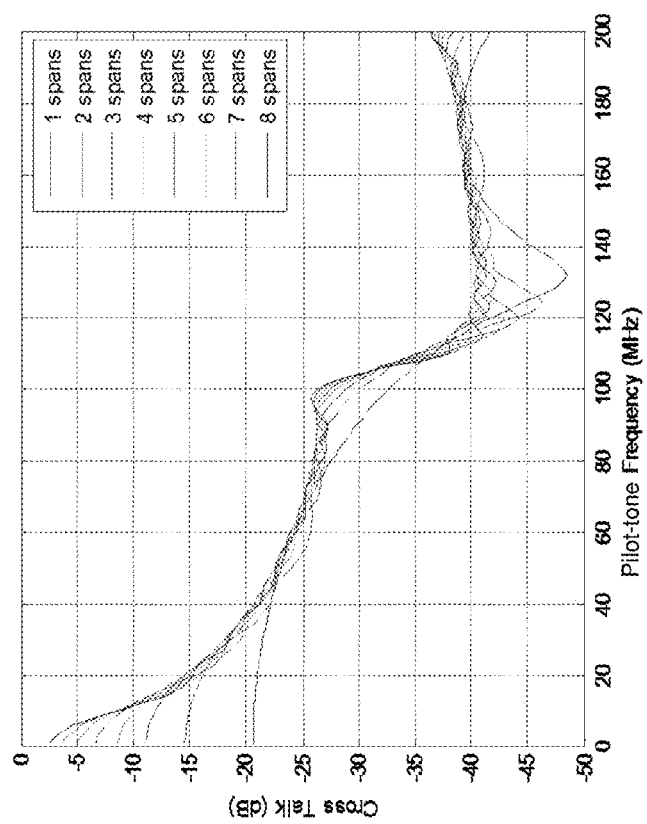
FIG. 4a is a graph illustrating frequency dependency of SRS for a transmission link based on a large effective area fiber (LEAF)

Turning to FIGS. 4a and 4b, graphs outlining SRS crosstalk values with respect to pilot tone frequencies are shown (where the individual curves are shown in increasing order at the left axis, with the 1-span curve being the lowest curve, and the 8-spans curve being the highest curve at the left axis). These graphs reflect the SRS crosstalk dependency on pilot tone frequency. In FIG. 4a, the graph reflects SRS crosstalk values on a Y-axis against pilot tone frequency (in MHz) on the X-axis for a dispersion uncompensated LEAF system while FIG. 4b shows the same for a dispersion uncompensated standard single mode fiber (SSMF) system. The span length is 80 km. In each SRS crosstalk scenario, there were 80 channels in the C band with a signal channel being the first channel.

With respect to FIG. 4a, an optical transmission link including a LEAF optical fiber had chromatic dispersion which was uncompensated over the 80 km span with −1 dBm channel fiber (or individual fiber) input power. An optical transmission link including an SSMF optical fiber (FIG. 4b) had chromatic dispersion which was also uncompensated over the 80 km span with +1 dBm per channel fiber input power.

For the 80 channels within the system, the energy of a pilot tone associated with one of the channels is partially transferred to the other 79 channels and seen as ghost tones. In this manner, the pilot tone frequency of one wavelength channel is seen, in some form, on every other channel. As these ghost tones propagate through the network, different phase is added to different ghost tones which may result in these ghost tones partially cancelling each other out when detected. In order to keep the ghost tones out of phase, a higher frequency pilot tone is preferred.

As can be seen for the current examples, the level of SRS crosstalk with respect to the frequency of the pilot tone is reduced as the pilot tone frequency increases. A higher frequency pilot tone is preferred to reduce or minimize SRS crosstalk effects. Although only a single span length has been shown, it is understood that even if the span lengths are different, a general trend remains whereby a pilot tone having a higher frequency results in smaller SRS crosstalk effects between the channels. However, when a higher frequency pilot tone is used, other adverse effects may be introduced, such as chromatic dispersion (CD) fading which relates to the phenomenon in which the phase velocity of a wavelength depends on its frequency.

Figure 5B:
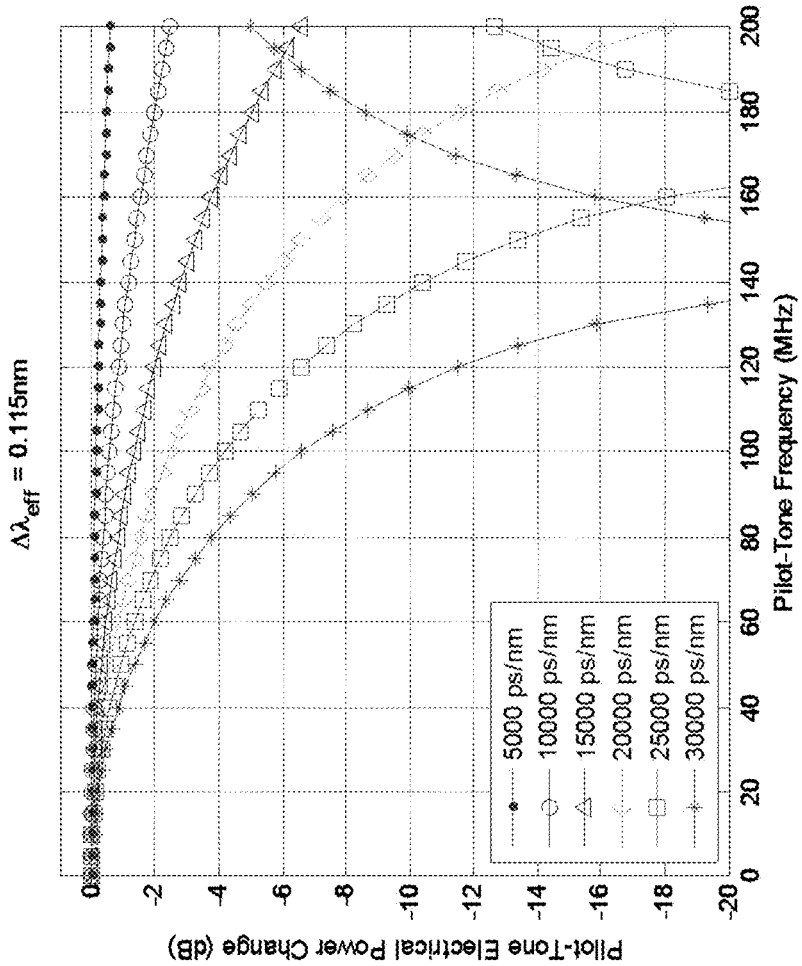
FIG. 5b is a graph illustrating chromatic dispersion (CD) induced pilot tone power fading vs. pilot tone frequency.
Figure 5A:
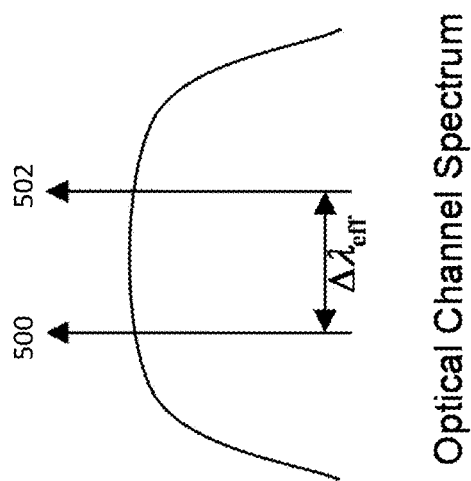
FIG. 5a is a schematic diagram of an optical channel spectrum.

With respect to CD effects, FIG. 5a provides a schematic diagram showing an optical channel spectrum while FIG. 5b provides a graph showing pilot tone electrical power change vs pilot tone frequency at some accumulated chromatic dispersions. In FIG. 5b, pilot tone electrical power change (in dB) is shown on the Y-axis and pilot tone frequency (in MHz) is shown on the X-axis.

When modulation is applied to a continuous wave (CW) light, its spectrum is broadened. In other words, this results in the channel spectrum being broadened. A channel with a broadened spectrum may be seen as a channel including an infinite number of frequency components.

A pilot tone is then applied on every frequency component. Initially, the phases of the pilot tone associated with all frequency components are the same such that the total pilot tone power is at an initial value. When the frequency components propagate through the transmission fiber, each associated pilot tone experiences a different phase change such that the total pilot tone power is reduced. This differential phase change is caused by chromatic dispersion. With chromatic dispersion, the total pilot tone power is reduced from the initial value. This affects the reading or detection by the pilot tone detector.

As will be understood, the modeling of this CD fading effect involves an infinite number of frequency components. To simplify this modeling, the broadened channel spectrum can be considered as having only two discrete frequency components seen as arrows 500 and 502 in FIG. 5a. The left arrow 500 represents the spectrum on the left side and the right arrow 502 represents the spectrum on the right side. The distance $\Delta\lambda_{eff}$ may be taken as approximately equal to half of the signal spectrum width. Although this picture is highly simplified, through simulations and experiments, it may be considered as a very good approximation.

For instance, as shown in FIG. 5a, when light at a wavelength represented by the left arrow 500 and light at a wavelength represented by the right arrow 502 are modulated by the same frequency, a phase difference is introduced between the two signals as they propagate along the transmission fiber (or optical channel). This is due to the fact that the light at the optical frequencies represented by the arrows 500 and 502 propagates at different speeds along the transmission fiber. The different speeds are caused by the chromatic dispersion. As the light portions at both frequencies 500 and 502 are modulated with the same pilot tone, the pilot tone may become faded or lose power, due to destructive interference between the pilot tone waveforms of the light portions at the frequencies 500 and 502, whereby the initial value of pilot tone power of the channel is reduced. The CD-caused fading effects typically increase as pilot tone frequencies increase. At certain combinations of $\Delta\lambda_{eff}$, CD magnitude, and optical fiber length, the different pilot tone frequencies may cancel themselves out, leading to a complete disappearance of the pilot tone.

A large CD may lead to a low signal to noise ratio (SNR) and/or a large power measurement error of the pilot tone, which adversely affects pilot tone based monitoring of channels within the telecommunication system.

In order to compensate for CD fading, an accumulated CD value is required. The accumulated CD value is either known by the system or may be calculated. In one embodiment, the accumulated CD value is a product of the length of the fiber span and a dispersion coefficient while a total accumulated chromatic dispersion may be seen as a sum of the accumulated CD from all of the fiber spans that the channel propagates upon being detected. Since CD fading is dependent on the optical signal spectrum, CD fading is therefore dependent on wavelength characteristics such as baud rate and spectral shape.

When the accumulated CD fading increases, the power within the pilot tone is reduced which results in the low SNR and power measurement error. The power change can be represented by the equation:

$$\Delta P_{dB} = 10\ \log_{10}[(1+\cos(2\pi f_{PT} CD\Delta\lambda_{eff})/2]$$

where $f_{PT}$ is the pilot tone frequency, CD is the accumulated chromatic dispersion between a transmitter and the pilot tone detector, $\Delta\lambda_{eff}$ is a fitting parameter or the effective spectral width of the channel being sensed (typically half of the spectral width). The pilot tone frequency is known based on the design of the system, the accumulated CD is calculated (as described above) and the fitting parameter is obtained by comparing measurement results and/or theoretical results from the equation.

As can be seen in the graph of FIG. 5b, there is less power change when the frequency of the pilot tone is at a lower value such as below 60 MHz, suggesting that a lower frequency pilot tone is preferred for reducing CD effects. Therefore, unlike the preferred pilot tone frequency for reducing SRS which is more desirable at a higher frequency, a lower frequency pilot tone is preferred for reducing CD fading or for compensating against CD effects.

Therefore, in order to overcome some of the disadvantages and problems in current systems, a novel method and system for optical performance monitoring via a dual frequency pilot tone is disclosed. By supplying a dual frequency pilot tone, the pilot tone detector 106 can adaptively select the preferred frequency pilot tone based on characteristics of the network 100. The dual frequency pilot tone can be applied either simultaneously or alternatively to the channel.

One advantage of the current disclosure is that by having a pilot tone at two different frequencies, current issues with single frequency pilot tone systems are reduced or mitigated. As each channel is modulated with the two pilot tone frequencies (both carrying the same, or identical, channel information), the pilot tone in the high frequency band can be adaptively selected to reduce or suppress SRS effects while the pilot tone in the low frequency band can be adaptively selected to reduce the CD fading effects.

For channels with a small accumulated chromatic dispersion, such as dispersion compensated channels or dispersion uncompensated channels with low dispersion fiber, the pilot tone in the high frequency band is preferably selected. An example of such a system is a large effective area fiber (LEAF) system. For dispersion un-compensated channels, the pilot tone in the low frequency band is preferably selected.

Figure 6:
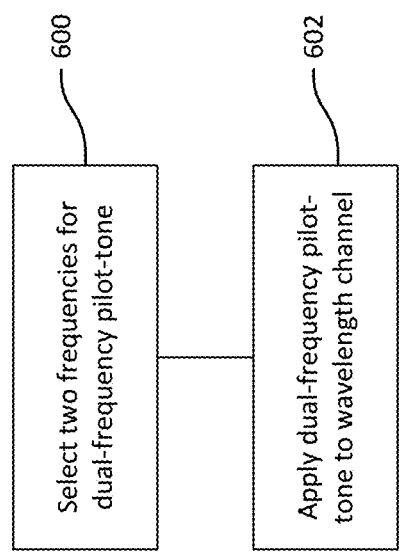
FIG. 6 is a method of implementing a dual frequency pilot tone.

Turning to FIG. 6, a flowchart outlining a method of providing a dual frequency pilot tone for an optical telecommunications system is shown. Initially, a first and a second frequency are selected 600 for the dual frequency pilot tone. The first frequency is preferably selected from a low frequency band while the second frequency is selected from a high frequency band. The frequency bands are determined based on SRS crosstalk and CD fading characteristics of the system. In a preferred embodiment, these SRS crosstalk and CD fading characteristics are determined via experimental studies performed on the system or simulations performed based on parameters of the system. In this manner, the low and high frequency bands may be determined prior to installation or operation of the system. Selection of the pilot tone frequency in the low frequency band is to lessen chromatic dispersion effects when it is detected. Selection of the pilot tone frequency in the high frequency band is to lessen SRS effects on the pilot tone when it is detected. These dual frequency pilot tones are then associated with different wavelengths propagating within the network.

In operation, the associated dual frequency pilot tones are then applied 602 to their associated wavelength channels in the optical telecommunications system 100. For channels with dual polarizations, the selected frequencies may either be applied simultaneously (concurrently) to X/Y polarization within the wavelength channel or applied alternatively (consecutively) to X/Y polarization within the communication channel.

Figure 7B:
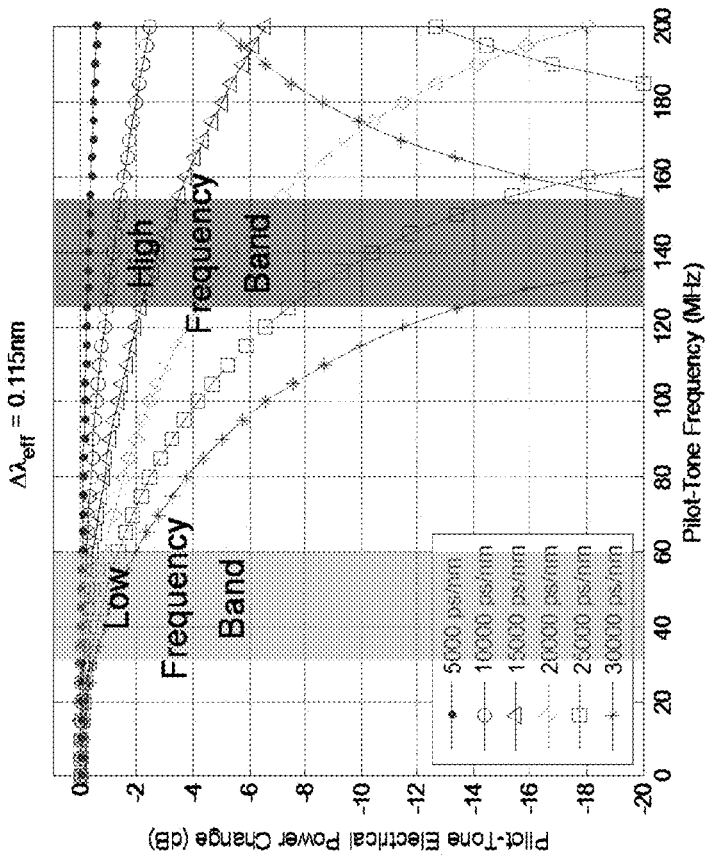
FIG. 7b is a graph illustrating CD induced pilot tone power fading vs. pilot tone frequency in low and high frequency bands.
Figure 7A:
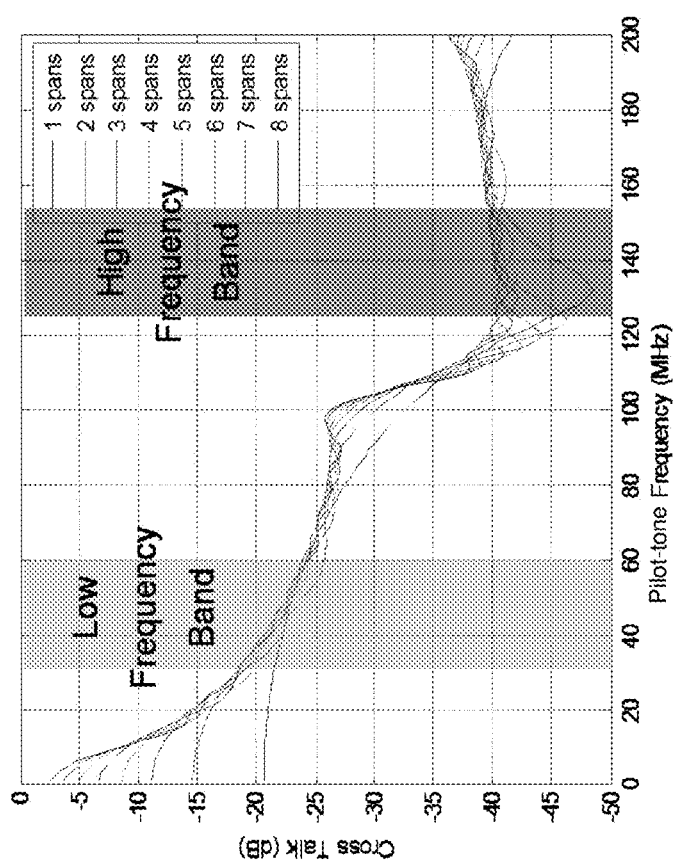
FIG. 7a is a graph illustrating SRS induced cross-talk vs. pilot tone frequency in low and high frequency bands.

Turning to FIG. 7a, a graph showing crosstalk versus pilot tone frequency is shown (where the individual curves are shown in increasing order at the left axis, with the 1-span curve being the lowest curve, and the 8-spans curve being the highest curve at the left axis). On the Y-axis of the graph is the level of crosstalk (measured in dB) while on the X-axis is the pilot tone frequency (in MHz). As can be seen in the current example, within a low frequency band (such as between 30 to 60 MHz), the level of crosstalk is around −20 to −25 dB for systems having one to eight spans. Within a high frequency band (such as between 130 and 155 MHz), the cross-talk is around −40 dB for each of the systems having one to eight spans. In the high frequency band, the SRS effect is suppressed.

Turning to FIG. 7b, a graph showing pilot tone electrical power change vs pilot tone frequency is shown. On the Y-axis of this graph, the pilot tone electrical power change (in dB) is shown while on the X-axis, the pilot tone frequency (in MHz) is shown. At a low frequency band (such as between 30 to 60 MHz), the electrical power change is around 0 to −2 for accumulated chromatic dispersion values between 5000 ps/nm to 30000 ps/nm. At the higher frequency band (such as between 130 and 155 MHz), the electrical power change is quite varied for accumulated chromatic dispersion values between 5000 ps/nm to 30000 ps/nm.

Therefore, for the current system as reflected in FIGS. 7a and 7b, to reduce SRS effects, a pilot tone in the high frequency band is preferred and to reduce CD effects, a pilot tone in the low frequency band is preferred. In other words, one of the pilot tone frequencies is selected from a range between 30 to 60 MHz and a second of the pilot tone frequencies is selected from a range between 125 and 155 MHz. It is appreciated that for different systems, the frequency bands, or ranges, may differ.

Turning to FIG. 8a, a schematic diagram reflecting an embodiment of how the dual frequency pilot tone is applied to a wavelength channel is shown. In modern optical communication systems, e.g. coherent systems, both polarizations are used to carry information. In the current embodiment, the dual frequency pilot tone is applied to the X/Y polarization channels simultaneously whereby both frequencies carry the identical channel information. As can be seen, for both the X and Y polarization channels, both a high and low frequency pilot tone are simultaneously transmitted over each channel. In the current embodiment, each pilot tone frequency is transmitted for a single pilot tone bit before being switched to the other frequency pilot tone. In this embodiment, both frequencies of the dual frequency pilot tone exist at all times within each of the polarization channels. Based on the characteristics of the network, the pilot tone detector 106 can then adaptively select one of the two pilot tone frequencies to obtain the information being transmitted by the pilot tone.

Turning to FIG. 8b, a schematic diagram reflecting another embodiment of how the dual frequency pilot tone may be applied to a channel is shown. In the current embodiment, the dual frequencies of the pilot tone are applied alternatively to the X and Y polarization channels. Both frequencies of the dual-frequency pilot tone carry the same data.

In operation, as schematically shown in FIG. 8b, for the X polarization channel, the low frequency pilot tone is transmitted for one pilot tone bit and then replaced with the high frequency pilot tone for one bit. The opposite transmission occurs within the Y polarization channel with the high frequency pilot tone being delivered for one pilot tone bit and then replaced with the low frequency pilot tone for one pilot tone bit. In this embodiment, while only one frequency exists for each polarization channel at any given time, both frequencies exist in the system at all times. As one of the frequencies is transmitted in one polarization channel, the other frequency is transmitted in the other polarization channel. The pilot tone detector 106 can then adaptively select one of the two pilot tone frequencies to obtain the information being transmitted by the pilot tone based on the characteristics of the system.

Figure 9:
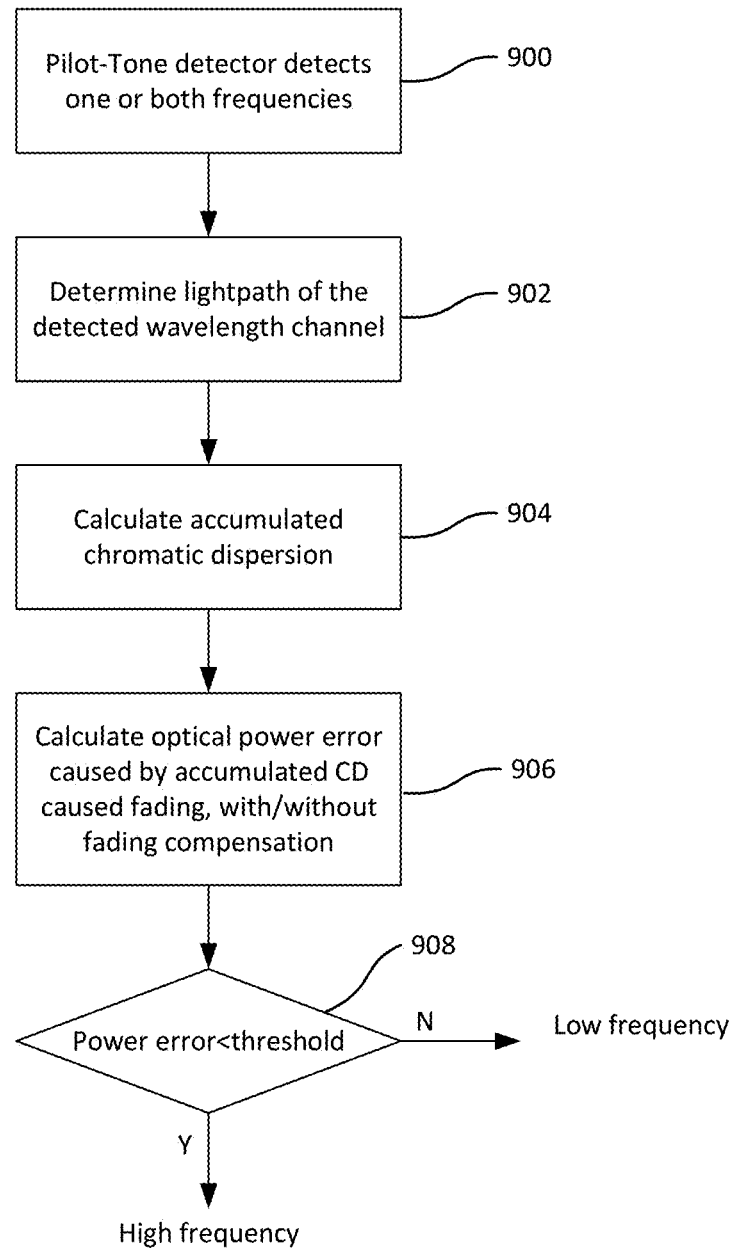
FIG. 9 is a flowchart outlining a method of frequency selection for a dual frequency pilot tone.

Turning to FIG. 9, a method of adaptive pilot tone detection or selection is shown. In the method of FIG. 9, the flowchart shows how a pilot tone detector determines which pilot tone of the dual frequency pilot tone to use in order to retrieve channel information.

Initially, the pilot tone detector detects at least one of the frequencies of the dual frequency pilot tone 900. After detecting the at least one of the frequencies, a lightpath of the channel associated with the pilot tone detector 106 is determined 902. This lightpath information is generally known and can be retrieved from network management software. In one embodiment, the information may be retrieved via a central, or distributed, controller or processing unit. The lightpath information may also be based on a best lightpath as determined by the controller. The chromatic dispersion of the wavelength channel is then calculated, accumulated or obtained 904. In one embodiment, the chromatic dispersion may be calculated between a transmitter within a node and a pilot tone detector. This can be seen as an accumulated chromatic dispersion value. As discussed above, the accumulated CD value is seen as the product of the length of the propagated fiber span (or optical channel) and a dispersion co-efficient. After determining the accumulated chromatic dispersion value, an optical pilot tone power error caused by the accumulated chromatic dispersion fading is calculated 906. The pilot tone power error can be calculated based on the equation disclosed above using specific values relating to the channel characteristics. This pilot tone power error is then compared to a threshold value, such as 1 or 2 dB, to determine if the calculated optical pilot tone power error is less than the threshold value 908. If the optical pilot tone power error caused by CD is deemed to be more than the threshold, the low frequency pilot tone is adaptively selected and if the optical pilot tone power error is deemed to be less than the threshold, the high frequency pilot tone is adaptively selected. If the optical pilot tone power error is equal to the threshold, either pilot tone frequency can be selected. The selected pilot tone frequency is then used to derive the power of the channel along with any other characteristics, if available or necessary.

Turning to FIG. 10, pilot tone detector 1000 is shown. Pilot tone detector 1000 includes photodiode 1002, processor 1004 and computer-readable medium 1006.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of optical telecommunications performance monitoring comprising:
    transmitting, by an optical transmitter, a dual frequency pilot tone to a wavelength channel in an optical transmission fiber,
        the dual frequency pilot tone including a first frequency in a first frequency range and a second frequency in a second frequency range,
        the first frequency range being between 30 MHz and 60 and the second frequency range being between 125 MHz and 155 MHz,
        the first frequency range exhibiting less chromatic dispersion effects in the wavelength channel than the second frequency range, and
        the second frequency range exhibiting less stimulated Raman scattering (SRS) effects in the wavelength channel than the first frequency range; and
    selecting, by a pilot tone detector, one of the frequencies of the dual frequency pilot tone from which to obtain wavelength channel information for the wavelength channel in the optical transmission fiber, the selecting comprising:
        calculating an accumulated chromatic dispersion value by:
            determining a lightpath of the wavelength channel; and
            accumulating chromatic dispersion along the lightpath;
        calculating a pilot tone power error value for the wavelength channel based on the accumulated chromatic dispersion value;
        comparing the pilot tone power error value with a threshold value; and
        selecting one of the frequencies in accordance with the comparing of the pilot tone power error value with the threshold value.

2. The method of claim 1 wherein the first frequency range is selected to lessen the chromatic dispersion effects.

3. The method of claim 1 wherein the second frequency range is selected to lessen the SRS effects.

4. The method of claim 1 wherein transmitting comprises:
    transmitting both frequencies simultaneously to an X polarization channel of the wavelength channel; and
    transmitting both frequencies simultaneously to a Y polarization channel of the wavelength channel.

5. The method of claim 1 wherein transmitting comprises:
    transmitting both frequencies, in an alternating manner, to an X polarization channel of the wavelength channel; and transmitting both frequencies, in an alternating manner, to a Y polarization channel of the wavelength channel.

6. A method of optical telecommunications performance monitoring comprising:
    receiving, by a pilot tone detector from an optical transmission fiber, an optical signal;
    detecting, by the pilot tone detector in the optical signal, a dual frequency pilot tone associated with a wavelength channel in the optical signal, the dual frequency pilot tone including a first frequency in a first frequency range and a second frequency in a second frequency range, the first frequency range being between 30 MHz and 60 MHz and the second frequency range being between 125 MHz and 155 MHz; and
    selecting, by the pilot tone detector, one of the frequencies of the dual frequency pilot tone from which to obtain wavelength channel information for the wavelength channel in the optical signal, the selecting comprising:
        calculating an accumulated chromatic dispersion value by:
            determining a lightpath of the wavelength channel; and
            accumulating chromatic dispersion along the lightpath;
        calculating a pilot tone power error value for the wavelength channel based on the accumulated chromatic dispersion value;
        comparing the pilot tone power error value with a threshold value; and
        selecting one of the frequencies in accordance with the comparing of the pilot tone power error value with the threshold value.

7. The method of claim 6 wherein each of the frequencies carries identical wavelength channel information.

8. The method of claim 6 wherein the pilot tone power error value is represented by:

$$\Delta PdB = 10 \log 10[(1+\cos(2\pi f PT CD \Delta \lambda eff))/2]$$

where fPT is a pilot tone frequency, CD is an accumulated chromatic dispersion between a transmitter and a pilot tone detector, and $\Delta\lambda$eff is a fitting parameter or an effective spectral width of the wavelength channel being sensed.

9. The method of claim 7, wherein each of the frequencies carries identical wavelength channel information.

10. The method of claim 6, wherein the first frequency range is selected to lessen chromatic dispersion effects.

11. The method of claim 6, wherein the second frequency range is selected to lessen stimulated Raman scattering (SRS) effects.

12. A pilot tone detector comprising:
    a photodiode configured to receive, from an optical transmission fiber, an optical signal;
    a non-transitory computer-readable medium comprising instructions;
    a processor in communication with the non-transitory computer-readable medium, wherein the processor executes the instructions to:
        detect, in the optical signal, a dual frequency pilot tone associated with a wavelength channel in the optical signal, the dual frequency pilot tone including a first frequency in a first frequency range and a second frequency in a second frequency range, wherein the first frequency range is between 30 MHz and 60 MHz and the second frequency range is between 125 MHz and 155 MHz; and
        select one of the frequencies of the dual frequency pilot tone from which to obtain wavelength channel information for the wavelength channel in the optical signal, wherein the processor executing the instructions to select comprise the processor executing the instructions to:
            calculate an accumulated chromatic dispersion value by:
                determine a lightpath of the wavelength channel; and
                accumulate chromatic dispersion along the lightpath;
            calculate a pilot tone power error value for the wavelength channel based on the accumulated chromatic dispersion value;
            compare the pilot tone power error value with a threshold value; and
            select one of the frequencies in accordance with the compare of the pilot tone power error value with the threshold value.

13. The pilot tone detector of claim 12, wherein each of the frequencies carries identical wavelength channel information.

14. The pilot tone detector of claim 12, wherein the first frequency range is selected to lessen chromatic dispersion effects.

15. The pilot tone detector of claim 12, wherein the second frequency range is selected to lessen stimulated Raman scattering (SRS) effects.

16. The pilot tone detector of claim 12 wherein the pilot tone power error value is represented by:

$$\Delta PdB = 10 \log 10[(1+\cos(2\lambda f PT CD \Delta \lambda eff))/2]$$

where fPT is a pilot tone frequency, CD is an accumulated chromatic dispersion between a transmitter and a pilot tone detector, and $\Delta\lambda$eff is a fitting parameter or an effective spectral width of the wavelength channel being sensed.

* * * * *

UNITED STATES PATENT AND TRADEMARK OFFICE
CERTIFICATE OF CORRECTION

PATENT NO. : 10,432,303 B2
APPLICATION NO. : 15/200325
DATED : October 1, 2019
INVENTOR(S) : Zhiping Jiang Page 1 of 1

It is certified that error appears in the above-identified patent and that said Letters Patent is hereby corrected as shown below:

In the Claims

Column 10, Line 27, Claim 1, delete "30 MHz and 60" and insert --30 MHz and 60 MHz--.

Signed and Sealed this
Twenty-sixth Day of November, 2019

Andrei Iancu
*Director of the United States Patent and Trademark Office*